United States Patent [19]

Lewis

[11] Patent Number: 4,636,317

[45] Date of Patent: Jan. 13, 1987

[54] RECYCLING OF METALWORKING FLUIDS

[75] Inventor: Elliott W. Lewis, San Marino, Calif.

[73] Assignee: Fluid Recycling Services, Inc., Santa Ana, Calif.

[21] Appl. No.: 755,439

[22] Filed: Jul. 16, 1985

[51] Int. Cl.⁴ .......................... B01D 33/02; C02F 1/32
[52] U.S. Cl. .................................. 210/748; 210/764; 210/781; 210/787; 210/806; 210/168; 210/241; 210/258
[58] Field of Search ............... 210/788, 781, 167, 168, 210/748, 764, 806, 787, 258, 241, 252, 259, 260, 202, 200, 201

[56] References Cited

U.S. PATENT DOCUMENTS

| | | | |
|---|---|---|---|
| 3,679,051 | 7/1972 | Larson et al. | 210/788 |
| 3,974,072 | 8/1974 | Birchall et al. | 210/167 |
| 4,325,663 | 4/1982 | Lee | 210/168 |
| 4,366,069 | 12/1982 | Dudrey et al. | 210/788 |
| 4,521,313 | 6/1985 | Wolde-Michael | 210/788 |
| 4,534,869 | 8/1985 | Seibert | 210/788 |

FOREIGN PATENT DOCUMENTS 704645  12/1979  U.S.S.R. ............................ 210/167

OTHER PUBLICATIONS

J. H. Wright; "Coolant Pasteurization—A Promising Answer"; *Manufacturing Engineering*, Nov. 1984, pp. 83–84.
West, J.; "Disc-Bowl Centrifuges"; *Chemical Engineering*; Jan. 7, 1985; pp. 69–73.
Westfalia OTA 14 Separator—data sheet.
Almco Division Technical Brochure.

*Primary Examiner*—Benoît Castel
*Attorney, Agent, or Firm*—Thomas A. Schenach

[57] ABSTRACT

A process for the recycling of used and contaminated metalworking fluids, both oil-based and water-based, employing mobile equipment, is disclosed.

5 Claims, No Drawings

RECYCLING OF METALWORKING FLUIDS

This invention relates to the recycling of used and contaminated metal-working fluids, both water-based and oil-based. More particularly, it relates to a novel combination of filtration, centrifugal separation, and sterilization accomplished by mobile equipment capable of being employed at different locations to carry out on-site recycling of such fluids.

BACKGROUND OF THE INVENTION

The accumulation of chemical waste has become a major health and environmental problem, and numerous legislation such as the Resource Conservation and Recovery Act (RCRA) has already been passed to deal with it. One of the industries that is severely impacted by this legislation is the metalworking industry. Metalworking includes drilling, turning, drawing, forming, sawing, grinding, milling, tapping, threading, honing, broaching, and numerous other machining operations carried out during the manufacture of metal parts, equipment, and artifacts. These processes are highly dependent on proper lubrication and cooling, both of the tool and of the piece of metal on which the operation is carried out ("the workpiece"), and thousands of fluids, both water-based and oil-based, have been developed to meet these needs. Metalworking now includes operations such as the electric discharge machines, which employ petroleum-based fluids (EDM fluids) as cooling and insulating media. Exact estimates vary, but at the time of the filing of this application, the consumption of metalworking fluids is believed to be in excess of three billion gallons per year.

Inevitably, contamination of metalworking fluids will occur, eventually reaching a point where the fluid will no longer be capable of performing its function of cooling and lubricating and may actually be causing corrosion, plugging of lines, and other problems. This contamination occurs from many sources. Metal "fines" and debris from the tools and grinding wheels can accumulate as an abrasive sludge in both oil and water-based fluids. Lubricating oils, way lubricants, and hydraulic fluids from the machinery ("tramp oils") will always find their way into water-based fluids; and, conversely, moisture will usually find its way into oil-based products. Microorganisms present a special problem. Bacteria such as pseudomonas species and Fungi such as Candida species can flourish in oil-water mixtures such as a water-based metalworking fluid contaminated with tramp oils. The result is sludge and deposits, offensive odors, the formation of corrosive acids, and destruction of essential additives necessary for proper fluid performance. Such techniques as filtration of metal fines, the skimming or suctioning off of tramp oil, and the addition of biocides traditionally been used to prolong the life of metalworking fluids. But eventually the fluid will become contaminated to the point where such measures are no longer effective, and at this point in the past the fluid was changed out and disposed of.

Disposal of used and contaminated metalworking fluids, however, is no longer simple and has become very expensive. As recently as ten years ago, said fluids could be trucked to a convenient dumpsite at minimal cost. This is no longer the case. Under RCRA and other legislation, most contaminated metalworking fluid is classified as a hazardous waste which can only be disposed of in a few specially selected dumpsites, which are often located many miles from the plant where the waste was generated. Scrupulous record-keeping must be maintained on such wastes and expensive chemical analyses on each shipment are often required. There are transportation costs, dumping fees, taxes, and miscellaneous additional expenses, to the point that it is now more expensive to dispose of a gallon of metalworking fluid than it originally was to purchase it. But this situation, serious as it is today, will grow even worse, inasmuch as recently enacted legislation calls for the elimination of all chemical waste dumping within four years. When that legislation has gone into effect, the metalworking industry could be faced with billions of gallons of contaminated fluids for which no satisfactory means of disposal will exist. Even now, numerous plants are faced with the necessity of dealing with considerable quantities of contaminated fluids which have been gradually accumulating on the plant site and now must be disposed of in a safe and legal manner.

An obvious alternative to the dumping of used metalworking fluids is that of recycling. Recycling of used crankcase motor oils and other lubricants has been carried out for many years and has received increasing emphasis in view of the energy crisis. However the problems in recycling metalworking fluids are complicated by the bewildering variety of said fluids that exist in the marketplace. There are three basic types of fluid; cutting oils, soluble oils, and synthetics. Cutting oils are petroleum oils used neat or compounded with additives to assist lubrication, protect against corrosion, help wet the metal surface, and so on. They may be of many different viscosities, depending on the metal being machined and the type of machining operation. EDM fluids, while not properly classed as cutting oils, are similar in that they are usually neat petroleum oils (of low viscosity). Soluble oils (or more accurately, emulsifiable oils) are petroleum oils containing emulsifiers and are used in the form of dilute emulsions (usually 5 to 10% soluble oil in water). They combine the lubricating abilities of an oil with the better cooling capabilities of water, and traditionally they have been the most popular type of metalworking fluid. However there is increasing interest in synthetics, which are water-based lubricants which contain no petroleum oil but rely for their lubricating abilities on water-soluble additives such as the polyalkylene glycols. Like soluble oils, synthetics are normally diluted further with water in use. Both the soluble oils and the synthetics may contain supplemental additives such as rust inhibitors, extreme pressure additives, antifoam agents, and biocides, as is well known in the art. Several different fluids may be in use in a given plant at the same time, and the degree of contamination may vary from fluid to fluid and from machine to machine. Thus the problem is one of developing a recycling process that can be used on a multiplicity of contaminated fluids, including soluble oils and synthetics at different concentrations in water and oil-based fluids of differing viscosities. It should be further noted that there may be differences in composition and contamination in a single storage tank or reservoir of used fluid. For example, in an ordinary cyclindrical tank, a contaminated soluble oil containing metal fines, tramp oil, and bacterial sludge will naturally tend to stratify on standing, with the metal settling to the bottom, the oil floating on top, and the bacterial sludge collecting in an interfacial emulsion between the oil and the water. It would be impractical or at the least cumbersome to re-mix the contents of such a tank before recycling, and so inherent in the process itself must be the ability to handle differences in composition encountered as the contaminated fluid is withdrawn from storage into the recycling unit.

In summary, there is an urgent need for a means and process capable of carrying out recycling on a wide variety of water- and oil-based metalworking fluids. There is a further need for a process and means capable of adjusting quickly to differences in fluids or to differences in the composition of the same fluid. There is a further need for a process and means of recycling contaminated metalworking fluids that will be mobile and capable of being used at different plants or different locations within the same plant. The process and means of my invention satisfy these objects.

PRIOR ART

The use of centrifuges for separating liquids of different gravities and for separating solids from liquids is of course well known in the art. Stationary centrifuges have long been employed on vessels to separate water from fuel oil, diesel fuel, and lubricating oils. More recently, central stationary centrifugal units have been installed in plants to remove metal fines and tramp oils from used metalworking fluids. Pasteurizers have been employed with these stationary units in order to destroy microorganisms in the fluids. Such stationary units, however, are designed around a relatively small number of fluids and are not equipped to process the wide variety of oil- and water-based fluids that might be encountered in the field. This is a serious shortcoming of such installations for which the process and means of my invention provide a solution. Additionally, inasmuch as these are fixed installations, they cannot be conveniently moved from plant to plant or from one source of contaminated fluid within a plant to another. However it must be emphasized that, even if one did shrink or "downsize" a stationary unit of this sort so that it could be transported on a truck or trailer, it would still be unable to perform the functions and satisfy the objects of my invention.

DESCRIPTION OF THE INVENTION

The key elements of my invention are the following:
1. Pumping means to accommodate either a predominately water-based or a predominately oil-based fluid stream;
2. Solid separation means, comprising preferably a hydrocyclone or alternately filters of appropriate capacity to eliminate excess solid loadings from the fluid stream;
3. Sterilization means to eliminate or reduce the concentration of microorganisms in the fluid stream, said sterilization means comprising either flash pasteurization or radiation;
4. High speed centrifugation means, comprising preferably a high-speed disk bowl centrifuge, designed for manual or automatic cleaning of accumulated solids;
5. Available to said centrifuge, a multiplicity of ring dams or gravity disks to adjust the separation line within the centrifuge to accommodate the differing levels of oil and water within the fluid stream; and
6. Mobile means to transport said equipment from one site to another. These elements and the use of thereof will now be discussed in detail.

The selection of appropriate pumping means requires considerable attention in view of the wide variety of fluids that are meant to be processed by my invention. Positive displacement pumps which provide a minimum of shearing action such as vane or gear pumps are most useful. Care must be taken to insure that the elastomeric materials in the pumps and appendages thereto are properly selected for compatibility with both oil-and water-based fluids. It is most useful to maintain two pumps in parallel, one selected specifically for oil-, the other selected specifically for water-based fluids, directing the fluid stream in use to the appropriate pump by means of suitable piping and and valving as would be obvious to one skilled in the art. A suction filter ahead of the pump is desirable to remove large metal chips, "swarf", etc. which might otherwise have an abrasive effect on the moving parts of the pump.

Contaminated fluids, as noted hereinabove, inevitably contain large amounts of metal fines and other debris, most of which will not be trapped by the sort of filter recommended above for removal of larger solids from the fluid before it enters the pump. Such fines are normally too small and have to be removed by other means. Centrifugation is capable of removing such fines, but the capacity of a disk bowl centrifuge to remove solids is severely limited, being usually less than 1%. Additional solid separation means are therefore necessary ahead of the centrifuge in order to reduce the concentration of solids to less than 1%. A particularly preferred solid separation means is the hydrocyclone. The principle and design of a hydrocyclone is well known in the art, but will be described briefly herein for convenience. In a typical hydrocyclone, the fluid stream is passed into the top of a closed conical chamber, which imparts a circular motion and centrifugal force to the stream as it passes down from the wide to the narrow portion of the chamber. The solids, being heavier than the liquid, are forced by centrifugal force to the walls of the hydrocyclone, and are gradually washed by the flow of the stream downwards until they are ejected from an opening in the bottom. The liquid meanwhile, which is now relatively free of solids, is discharged through a center tube running from near the bottom of the cone and back of the top, from which it flows onto the next stage of the process, the sterilization.

Sterilization can be accomplished by the use of heat in a flash pasteurizer. In the pasteurization unit, the fluid is passed over heating elements which rapidly raise its temperature to about 65° to 75° C. It has been claimed that pasteurization, while effective with milk, is "ineffective and impractical for reprocessing materials like coolants over and over" (J. H. Wright, *Manufacturing Engineering*, November 1984, pp. 83–84). In spite of the negative findings of this prior art, I have found flash pasteurization to be a highly practical method of addressing the problems of bacteria and fungi contamination when used in combination with the other elements of my invention. An alternate sterilization method is that of irradiation, especially by ultraviolet light, although any practical source of radiation capable of destroying microorganisms could be conceived as being useful within the scope of my invention. Although I have conventionally used the sterilization step ahead of centrifugation, it would not be outside the scope of the invention to insert it at some other point, for example, in the flow of recycled coolant after it has emerged from the centifuge.

Centrifugation is carried out in a high speed disk bowl centrifuge, operating at a speed of from about 8000 to 14000 rpm and capable of handling a fluid stream flow of from about 5 to 25 gallons per minute. Disk bowl centrifuges are well known in the art—descriptions can be found, for example, in the article "Disc-Bowl Centrifuges" by James West in *Chemical Engineering*, Jan. 7, 1985, pp. 69–73. It has been necessary however, to modify the normal operation of the disk-bowl centrifuge in order to accomplish the aims of this invention. In an ordinary disk bowl centrifuge, as the name implies, there is a rapidly rotatable bowl containing, arranged around its axis of rotation, a series of separation disks held apart by spacers. The angle between the plane of the disks and the axis is typically 30 to 50 degrees, and each disk contains holes, conventionally four or eight, arranged at 90 degree positions on the disk. The holes will be placed at different distances from the center axis, depending on whether fluid to be processed is predominately oil- or water-based. Around the walls of the bowl is a removable liner and periodically the bowl can be stopped for the cleaning of solid fines that have accumulated on this liner. Alternately the bowl may be capable of being momentarily opened while still in motion for ejection of accumulated solids.

In conventional operation, the fluid to be processed enters the top of the centrifuge through an inlet tube from which it is discharged by gravity into the bottom of the bowl. It moves outwards through a distribution chamber and then begins to move upwards between the disk stack. The centrifugal force created by the rapid rotation of the bowl forces any remaining solids within the fluid to the liner, and meanwhile creates a separation between the oil and the water phases in the stream, the heavier water moving closer to the walls of the bowl, the lighter oil remaining closer to the center shaft. As fluid continues to enter the centrifuge, there is a distinct separation line established between the oil and water phases, which must be located as close as possible to the center of the holes. The holes, the upper portion of the wall of the bowl, which tapers inwards towards the axis and an interior conical baffle around the axis above the disk stack combine to keep the oil and water phases separate as they leave the bowl. The oil phase flows between the interior of the baffle and the axis upwards and into a chamber from which it is pumped to storage. The water phase flows between the baffle and the bowl wall, past gravity disk or ring dam used to control its flow and into a second chamber where it too is pumped to storage. The liner, of course, is periodically removed for cleaning and disposal of collected solids.

As already noted, conventional centrifuges have not been able to handle the wide variety of contaminated fluids, both oil-based and water-based, that are routinely encountered in the metalworking industry. The reason is simple. Centrifuges are conventionally supplied with only one type of fluid in mind and the separation disk stack, the gravity disks or ring dams, and accessories are designed and "sized" for a particular separation—e.g. trace water from diesel fuel, or tramp oil from a single type of metalworking fluid. It is essential that the interface between the oil and water or "separation line" be properly oriented with respect to the holes in the disks, since this determines whether the oil and water phases will be properly separated when they flow from the centrifuge. Yet it is difficult to accomplish this when the actual composition of the fluid being processed (the oil/water ratio) will be different at different levels within the same contaminated fluid storage tank as already noted. The result of such a composition change will be a change in the position of the separation line, which can lead to some oil being ejected along with the water or vice versa. To some extent, adjustment of the position of the separation line can be accomplished by alteration of the flow rate of the fluid stream into the centrifuge, but this has not been found to eliminate the difficulty entirely.

I have found, however, that the problems occasioned by the extreme variation of composition from one contaminated fluid to another can be handled by use of a multiplicity of gravity disks or ring dams, sized to the particular fluid being processed. The ring dam is fitted onto the top of the bowl into the opening through which the water phase is ejected. It thereby applies an obstruction to the flow of said water phase and creates a back pressure in the bowl which resists the tendency of centrifugal force and inlet flow to move the separation line outwards from the center. By suitable selection of a ring dam of an appropriate diameter, which would be well within the skill of an ordinary operator, I now have a far more effective means to use in combination with flow rate to control the position of the separation line and thereby adjust the unit to fluids of widely varying composition as will be shown in the examples hereinbelow.

Finally, the last element of the invention, mobile means to transport the equipment from one site to another, should require no great discussion. It can be a truck or trailer or other suitable vehicle capable of handling the weight of the centrifuge and accessory equipment, and its selection should be within the skill of the ordinary operator.

To summarize the process of my invention, contaminated fluid is directed from its storage vessel or container into one of the pumps, depending on whether it is oil- or water-based. From the pump, it is sent through the solids separator to remove metal fines and other debris in excess of the 1% that the centrifuge can normally handle. It is then passed through the flash pasteurizer or other sterilizing means to remove bacteria and fungi, and flows into the centrifuge, which has been fitted with the appropriate ring dam or gravity disk. From the centrifuge the separated water- and oil streams are pumped to final storage. Metalworking fluids recycled in this way can generally be sent immediately back to the unit or units where they were originally used. It is conventionally known to add fresh fluid or biocide or antifoam agents to fluid that has been used in order to maintain the level of needed additives, since said additives are depleted by the metalworking operations themselves, and this can be done with recycled fluid obtained by means of my process and apparatus. However the recycling operation of my invention does not remove the basic additives that were still in the fluid prior to recycling.

The process will now be illustrated by means of specific examples.

EXAMPLE 1

The following equipment is assembled:

(1) A Blackmer positive displacement vane pump, capable of pumping up to 25 gallons per minute of water or water-based fluid;

(2) A Westfalia positive displacement gear pump capable of pumping up to 15 gallons per minute oil or oil-based fluid;

(3) A hydrocyclone manufactured by Encyclon, Inc. with a quarter-inch throat capable of handling up to 20 gallons per minute and removing 98% of all solid particles down to 5 microns in size;

(4) A Westfalia high speed manually cleaned disk bowl centrifuge having a bowl volune of 1.6 gallons, sludge space of 0.85 gallons, speed of 8500 rpm, and a rated capacity of 1700 gallons per hour;

(5) An ultraviolet sterilizer with a radiation output of 23,500 microwatt/square centimeter and a maximum flow rate of 18 gallons per minute for 100% *Escherichia coli* kill;

(6) A towable trailer capable of transporting the above apparatus and the associated piping, electrical controls, storage vessels and so on.

Available for the centrifuge are a series of ring dams or gravity disks differing in one-millimeter increments across the inside diameter which the operator can insert at the top of the bowl to adjust the position of the separation line to coincide with the center of the holes in the separation disk stack.

Operation of the apparatus of my invention in the cleaning of a contaminated soluble oil is as follows: The equipment is moved into position near the storage tank or reservoir in which the contaminated fluid is held. Flexible hosing is conveniently used to connect such storage vessel to the pumping means, in this case the positive displacement vane pump. The contaminated fluid is pumped from storage through the hydrocyclone to remove the bulk of the metal fines and other suspended solids, and then into the centrifuge. The two fluid streams, water-based coolant and tramp oil, emerging from the centrifuge are examined for completeness of separation. If the separation does not appear to be satisfactory, an increase or decrease in the flow rate will be made by adjustment of the pumping means and valving associated therewith. If this does not effect the improvement in separation, the equipment will be shut down, the centrifuge opened, and the separation line determined by inspection of the underside of one or more of the separation disks. Adjustment may then be made by the substitution of a ring dam of greater or lesser opening, depending on whether the separation line is to be moved farther away or closer towards the center of the bowl. It should be noted that a worker skilled in centrifugal separation operating according to the above instructions will rapidly be able to guess the proper ring dam to use with different contaminated fluids and will rarely need to disassemble the centrifuge except to periodically remove the liner and clean the accumulated solid fines therefrom. The recycled soluble oil then passes through the sterilizer to an appropriate storage vessel, or back into the reservoir of a metalworking machine for further use. Tramp oil and collected metal fines are conventionally set aside for collection by oil and metal waste recycling companies.

As representative of the results that can be obtained by the equipment of my invention, 1200 gallons of contaminated soluble oil containing 2 to 4% tramp oil and approximately 1% metal fines were recycled in less than three hours, as described above. The recycled coolant had a pH of 8.2, which was similar to that of a freshly prepared emulsion, indicating that the recycling process had not seriously altered the composition of the fluid.

The procedures for oil-based metalworking fluids and EDM fluids are similar, with adjustments in flow rates and ring dam selection being used to adjust for the differing viscosities and water contents. A light mineral oil lightly contaminated with water and containing approximately 0.1% metal fines was successfully processed in 105 minutes. The volume was 500 gallons. EDM fluid was somewhat slower, being processed at a rate of 500 gallons in 4 hours—however the solids content of the EDM fluid in this particular case varied from 0.15 to over 4% and was greasy in consistency, requiring more frequent interruption of centrifugation to clean the solids liner.

EXAMPLE 2

As an alternative to the equipment in Example 1, the following equipment is assembled:

(1) Pumping means as in Example 1;

(2) As alternate solid separation means, a basket-type filter containing a disposable 10- to 100-micron polyethylene filter bag to remove excess fines;

(3) As alternate sterilization means, two 18 kilowatt General Electric oil/water heaters for flash pasteurization. With oil-based fluids, these heaters can be used to reduce the viscosity and increase the flow rates and ease of separation within the centrifuge;

(4) A disk bowl centrifuge as in Example 1;

(5) A truck capable of transporting the apparatus (1) through (4).

In order to conserve heat generated by the flash pasteurizer, a heat exchanger can conveniently be inserted in the system to transfer some of the heat from the recycled fluid after centrifugation to the contaminated fluid as it leaves the filter prior to entering the pasteurizer. The use of heat exchangers for such a purpose is well known in the art.

Using apparatus such as described in Examples 1 and 2, I have been able to recycle contaminated oil-based fluids down to a level of 0.25% water or below, with residual solid fines being reduced to 0.1% at a 5 micron or smaller size. Likewise I have been able to recycle contaminated water-based fluids down to less than 0.25% residual tramp oil and 0.1% fines. Microorganism content can be reduced from $1 \times 10^6$ viable cells per milliliter down to $1 \times 10^4$ viable cells per milliliter or below, which is considered a minimal count.

The above Examples are by means of illustration only, and are not meant to be limiting within the scope of the following claims.

I claim:

1. A process for the recycling of used and contaminated metalworking fluids, both oil-based and water-based, said process employing a mobile recycling equipment capable of being moved into close proximity to the sources of said fluids, said equipment comprising the following elements:

(a) pumping means able to accomodate either a predominately water-based or a predominately oil-based fluid stream for pumping the contaminated fluids from storage sites through appropriate piping and valving means:

(b) solid separation means selected from hydrocylones and filters of appropriate capacities for eliminating excess solid loadings from the contaminated fluids;

(c) sterilization means selected from flash pasteurizers and irradiation devices inserted at an advantageous point in the piping means for destroying microorganisms within the contaminated fluids;

(d) centrifugal means selected from manually cleaned and self-cleaning high speed disk bowl centrifuges, said centrifugal means including a multiplicity of differently sized ring dams for adjusting a separation line within the centrifuge to accommodate the different concentrations of oil and water which may exist within contaminated fluids, said centrifugal means being used for separating contaminated fluids into an oil stream, an aqueous stream, and a solid residue, said pumping means solid separation means, sterilization means and centrifugal means being fluidly interconnected;

(e) mobile means for transporting said equipment from one site to another;

said process comprising:

positioning the mobile equipment in proximity to the contaminated metalworking fluid storage sites;

pumping the contaminated metalworking fluid from the storage sites to the solid separation means;

removing metal fines and suspended solids from said metalworking fluid in said separation means;

subjecting the solid depleted metalworking fluid to said sterilization means;

passing the sterilized metalworking fluid to the centrifugal means thereby recovering a recycled metalworking fluid.

2. The process of claim 1 wherein the used and contaminated oil-based metalworking fluid is a cutting oil.

3. The process of claim 1 wherein the used and contaminated oil-based metalworking fluid is an EDM fluid.

4. The process of claim 1 wherein the used and contaminated water-based metalworking fluid is a soluble oil.

5. The process of claim 1 wherein the used and contaminated water-based metalworking fluid is a synthetic.

* * * * *